United States Patent [19]
Troeller et al.

[11] Patent Number: 6,108,722
[45] Date of Patent: *Aug. 22, 2000

[54] DIRECT MEMORY ACCESS APPARATUS FOR TRANSFERRING A BLOCK OF DATA HAVING DISCONTINOUS ADDRESSES USING AN ADDRESS CALCULATING CIRCUIT

[75] Inventors: Mark W. Troeller, Visalia; Michael L. Fuccio, Sunnyvale; Linda S. Gardner, Saratoga; Henry P. Moreton, Oakland; Michael J. K. Nielsen, San Jose, all of Calif.

[73] Assignee: Silicon Grpahics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,602

[22] Filed: Sep. 13, 1996

[51] Int. Cl.⁷ .................................................. G06F 13/14
[52] U.S. Cl. ................................ 710/26; 710/24; 710/55; 711/206; 711/209; 345/526
[58] Field of Search .................................. 710/24, 26, 55; 712/25; 711/206, 209

[56] References Cited

U.S. PATENT DOCUMENTS

| | | | |
|---|---|---|---|
| 5,251,303 | 10/1993 | Fogg, Jr. et al. | 395/275 |
| 5,295,246 | 3/1994 | Bischoff et al. | 395/250 |
| 5,430,853 | 7/1995 | Arakawa | 395/275 |
| 5,649,230 | 7/1997 | Lentz | 710/52 |
| 5,655,090 | 8/1997 | Weingart | 712/25 |
| 5,802,546 | 9/1998 | Chisholm et al. | 711/100 |

*Primary Examiner*—Thomas C. Lee
*Assistant Examiner*—Albert Wang
*Attorney, Agent, or Firm*—Wagner, Murabito & Hao LLP

[57] ABSTRACT

A method and arrangement for a dma transfer mode having multiple transactions is provided. The invention generates a set of transaction entries for a DMA transfer each of which contains information related to the address and command instruction of a transaction. The transaction entries are stored in an address/cmd-output-FIFO. The invention negotiates for the control of the system bus. Upon gaining control of the bus, the commands and address relate to each transaction are sequentially place on the system bus. If the transaction is a read operation, data received back from the system bus is first stored in a data-in-FIFO before being sent to the desired destination. If the transaction is a write operation, the data to be transferred is first stored in a data-out-FIFO before being timely place on the system bus for transferring to the desired destination. In either case, the number of data words transferred is monitored to determine when a transaction is complete. The number of transactions carried out is also monitored to determine when a DMA transfer is complete.

18 Claims, 11 Drawing Sheets

Fig. 8A SClock
Fig. 8B SysAD
Fig. 8C SysCmd
Fig. 8D ViceValidOut_n
Fig. 8E ViceRelease_n

DIRECT MEMORY ACCESS APPARATUS FOR TRANSFERRING A BLOCK OF DATA HAVING DISCONTINOUS ADDRESSES USING AN ADDRESS CALCULATING CIRCUIT

BACKGROUND OF THE INVENTION

1. Field of the Invention

The invention generally relates to computer data transfer, and more particularly relates to a direct memory access (DMA) transfer.

2. Prior Art

In direct memory access (DMA) transfers, a special control circuit is provided to enable transfer of a large block of data directly between the device and the main memory without incurring excessive overhead by the CPU. The CPU still sets up the transfer by sending initialization information namely the starting address in memory, the data, and the number of words to be transferred to the DMA engine. However, subsequent to this, the DMA engine controls the actual data transfer.

Generally, the steps in the execution of a data transfer using DMA are as follows:

1. Upon being interrupted by the DMA controller, the CPU loads the DMA controller with a starting address for the memory transfer and the number of words to be transferred.
2. When the source device has the data ready to be transferred to the memory or when the destination device is ready for the transfer from the memory, the DMA controller sends a DMA request to the CPU.
3. The CPU acknowledges the DMA request, gives up the control of its address and data bus and appropriate control lines, and suspends any processing that requires use of the address and data bus.
4. The DMA controller provides an address and control signals to read or write. The source/destination device provides or accepts the data on the bus. After a data byte/word is transferred, the DMA controller increments its address register and decrements its word count register. The DMA controller repeats this step if the required number of words has not been transferred.
5. When the required number of words has been transferred, the DMA controller terminates the DMA request and interrupts the CPU to indicate that the DMA transfer is complete.

As discussed above, each DMA data transfer involves only one read or write transaction along with the starting address and byte/word count.

Graphic and video image processing in computer systems often involves heavy data transfer. A graphic or video image is made up of large blocks of pixels which translate into even larger blocks of data bytes. After graphic and video images enter a computer system through video ports, network ports, and mass storage devices such as CD-ROM, they are stored in a system/main memory. Graphic and video images are then transferred to a designated location, usually a local memory inside the graphics/video controller, where image processing is performed. After processing, however, graphics and video image data are transferred back to system/main memory for storage. Because DMA transfer can handle large transfer of data, DMA transfer is the logical method to utilize in moving graphic and video images data in computer systems.

In general, graphics and video image data for a display screen are stored as a bit map in the system memory which promotes ease and efficient display device download. In other words, the system memory is used to hold a bit-per-bit representation of the data being displayed on the monitor. With the resolution and details of graphics and video images constantly improving, the number of bytes/words and hence, the sizes of graphics and video image bitmaps are getting larger. As a result, a large system memory is often required. However, the local memory inside a graphics and video image controller is kept small for economic and technical reasons. For these reasons, graphics and video images are compressed to increase the speed of transfer between the system memory and the local memory.

Briefly, a screen bit map consists of multiple rows of data bytes/words. The number of rows and the number of bytes/words per row depend on the pixel format (e.g., 1024×768, 1280×1024, etc.) wherein each pixel may be represented by a number of data bytes/words. To reduce the amount of data being transferred, a compression algorithm selects from the screen bit map a block of data that is representative of the screen bit map. The compressed block of data is actually a "small" rectangular area of data from the screen bit map. Although small relative to the screen bit map, the small rectangular area of data consists of multiple rows of multiple words. The compressed block of data is transferred between the system and the local memory. At a later time, the compressed block of data can be later expanded by a decompression algorithm back to the original screen bit map.

Reference is now made to FIG. 1A illustrating, as an example, a 1024×768 screen bit map of a graphics/video image in a system memory. The small rectangular area of data representing the compressed block of data can be from any location within the screen bit map. As shown, the small rectangular area of data is located inside the screen bit map. As such, each row of a small rectangular area of data only contains some selected data from a screen bit map row. Hence, the row starting addresses of the small rectangular area of data are not continuous.

Given the amount of data involved in transferring the rectangular area of data, DMA transfer is still desirable. In DMA transferring a rectangular area of data having, for example, eight (8) rows of eight (8) words, eight separate DMA transfers may be required under the prior art due to the incontiguous starting memory addresses of the eight rows. More specifically, for each small rectangular row transfer, the DMA controller needs to interrupt the CPU for each small rectangular row transfer. In response, the CPU needs to provide the DMA controller with the starting system memory address and the number of word/byte count for each small rectangular row transfer. Each time the CPU is interrupted, other on-going or pending tasks are delayed.

Thus, a need exists for a DMA arrangement to transfer a block of data having multiple rows of multiple data bytes from a screen bit map wherein the row starting addresses are not continuous with minimum CPU intervention.

SUMMARY OF THE INVENTION

Accordingly, the present invention provides a DMA arrangement to efficiently transfer a block of data having multiple rows of multiple data bytes from a screen bit map wherein the row starting addresses are not continuous with minimum CPU intervention.

The present invention meets the above need with an arrangement to perform multiple transactions in a single DMA transfer. The arrangement is coupled to a central processor, a system memory, a system bus, and a local memory. The arrangement comprises: a first FIFO buffer, a second FIFO buffer, a third FIFO buffer, and a control circuit. The first FIFO buffer is coupled to the system bus and receives as input a plurality of transaction entries. The transaction entries provides information and instructions relating to transactions to be carried out by the arrangement. The second FIFO buffer is coupled to the system bus and the local memory. The second FIFO buffer is used as buffer in a read operation. The second FIFO buffer receives as input data from the system memory via the system bus and transfers the input data to the local memory. The third FIFO buffer is coupled to the local memory and the system bus. The third FIFO buffer is used as a buffer in a write transaction. The third FIFO buffer receives as input data from the local memory and transferring the input data to the system memory via the system bus. The control circuit is coupled to the first FIFO buffer, the second FIFO buffer, the third FIFO buffer, and the system bus. The control circuit determines from information provided by the transaction entries transaction count, transaction type, starting address of each transaction, and data word count of each transaction. The control circuit carries out the transactions by communicating with the system bus, monitoring number of data words transferred in a transaction, and monitoring number of transactions performed.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Figure 1A:
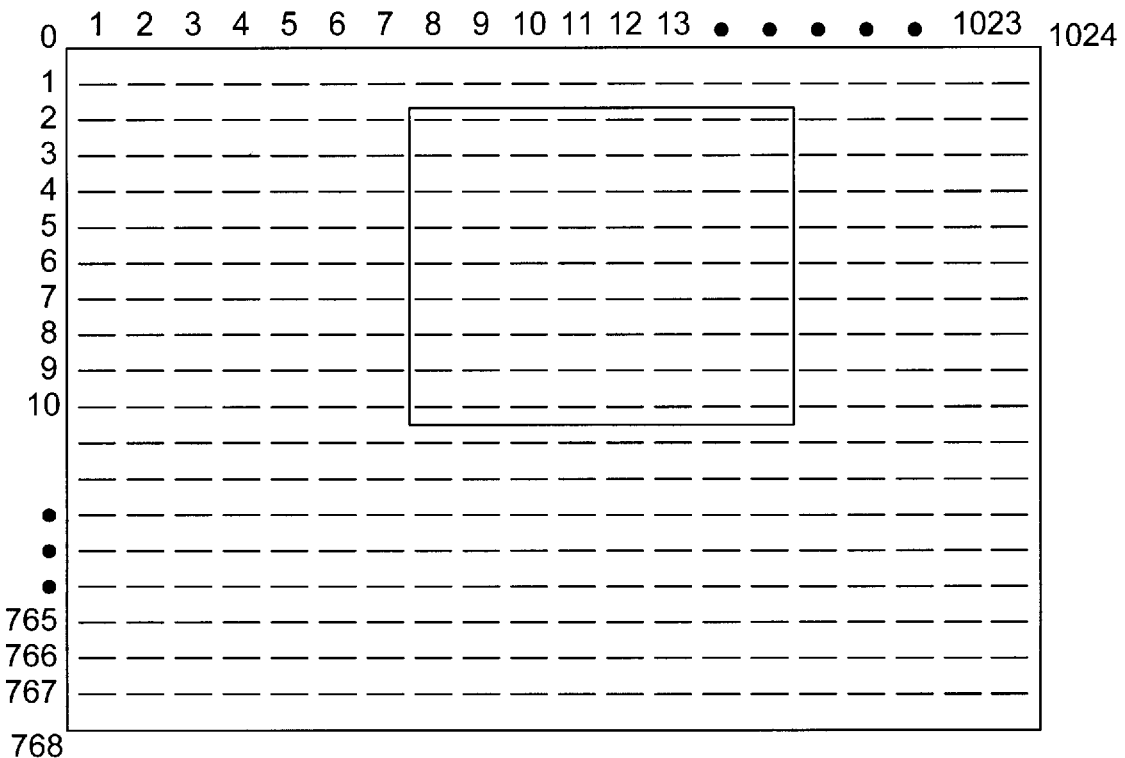
FIG. 1A is an illustration of a compressed rectangular area of data inside a screen bit map.
Figure 1B:
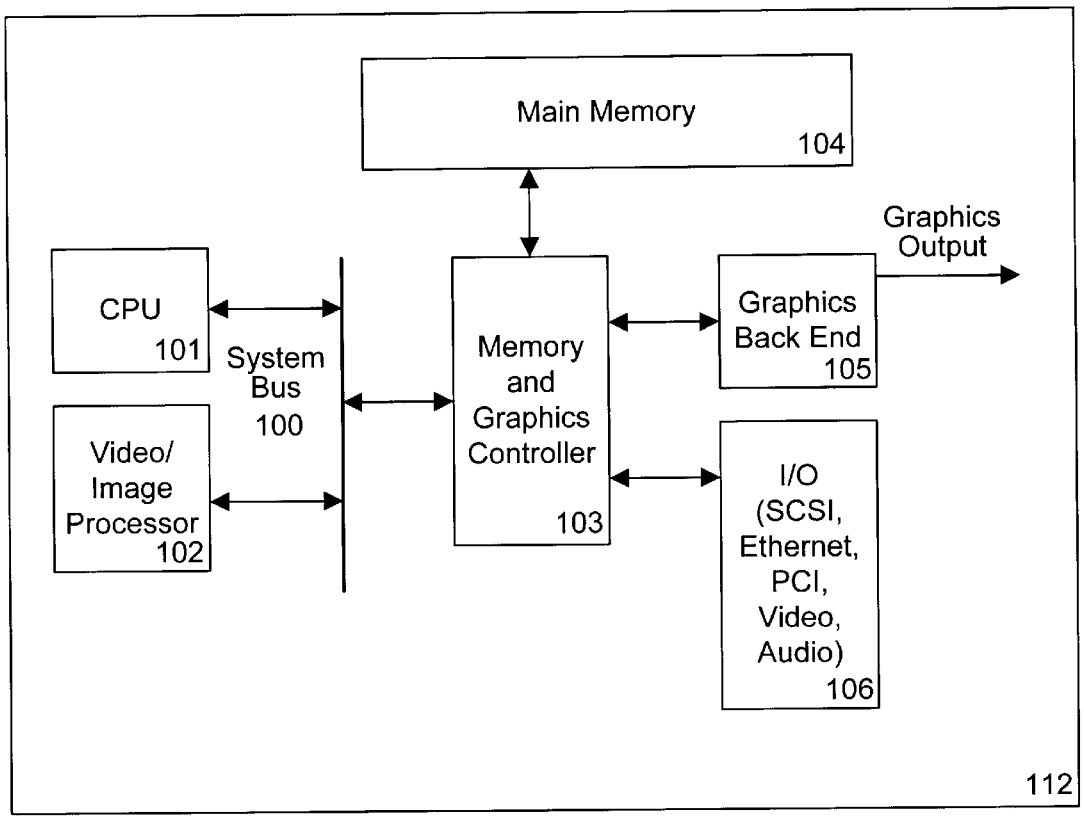
FIG. 1B is a system level block diagram illustrating a computer system.

Refer to FIG. 1B which illustrates a computer system 112. In general, computer system 112 used by the preferred embodiment of the present invention comprises bus 100 for communicating information; central processor 101 coupled with bus 100 for processing information and instructions; video/image processor 102 coupled to bus 100 for performing image processing, compression, and expansion; memory and graphics controller 103 coupled between bus 100 and main memory 104 for graphics processing (e.g., rendering, blending, z-buffer checks, pixel logical ops, frame buffer management) and controlling data transfer to and from main memory 104; I/O connections 106 (e.g., SCSI ports, ethernet ports, video ports, and audio ports) coupled to memory and graphics controller 103; and graphics back end processor 105 for formatting graphics/video output.

Figure 2:
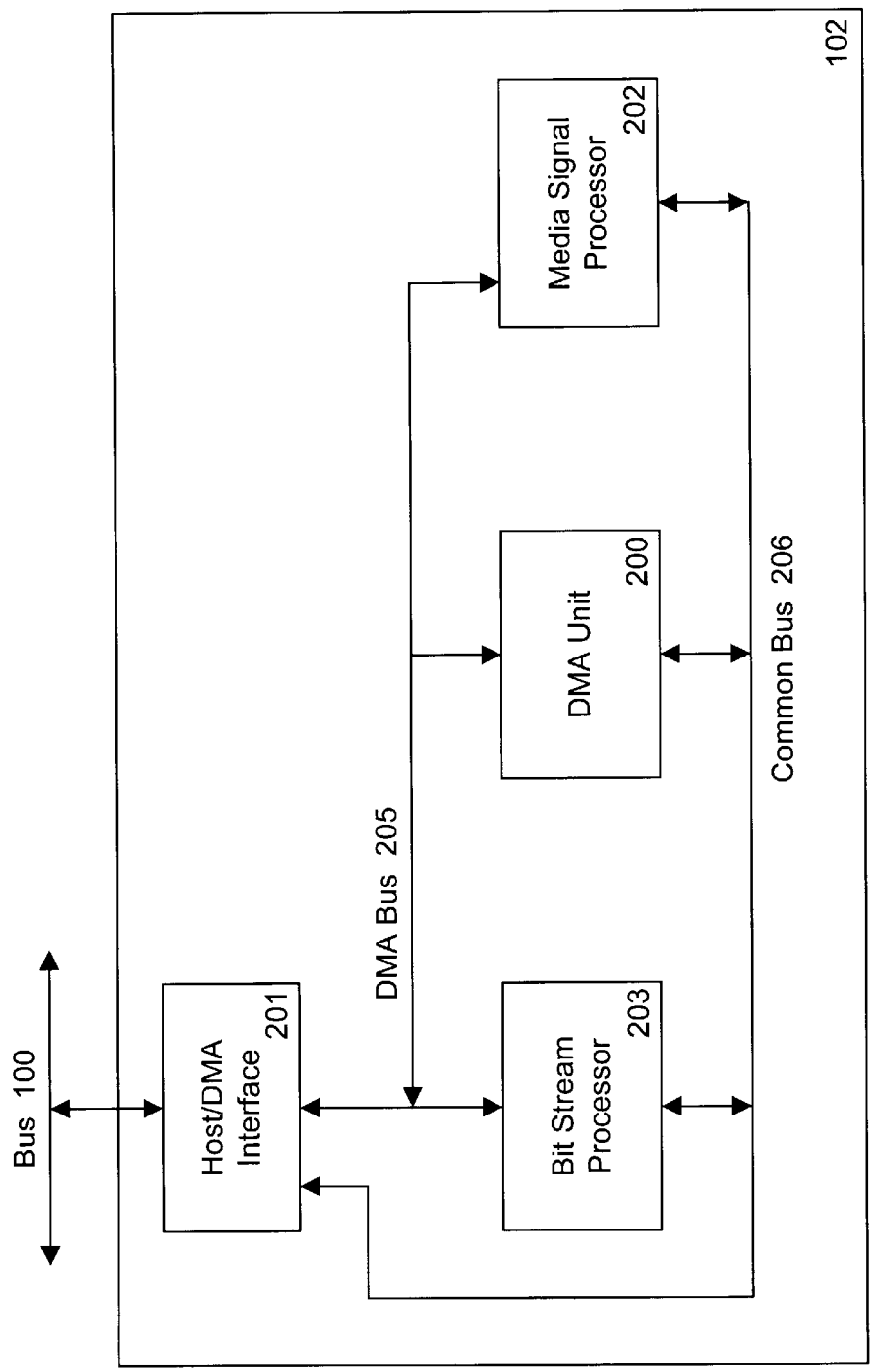
FIG. 2 is a block diagram illustrating the graphics/video processing unit shown in FIG. 1.
Figure 3:
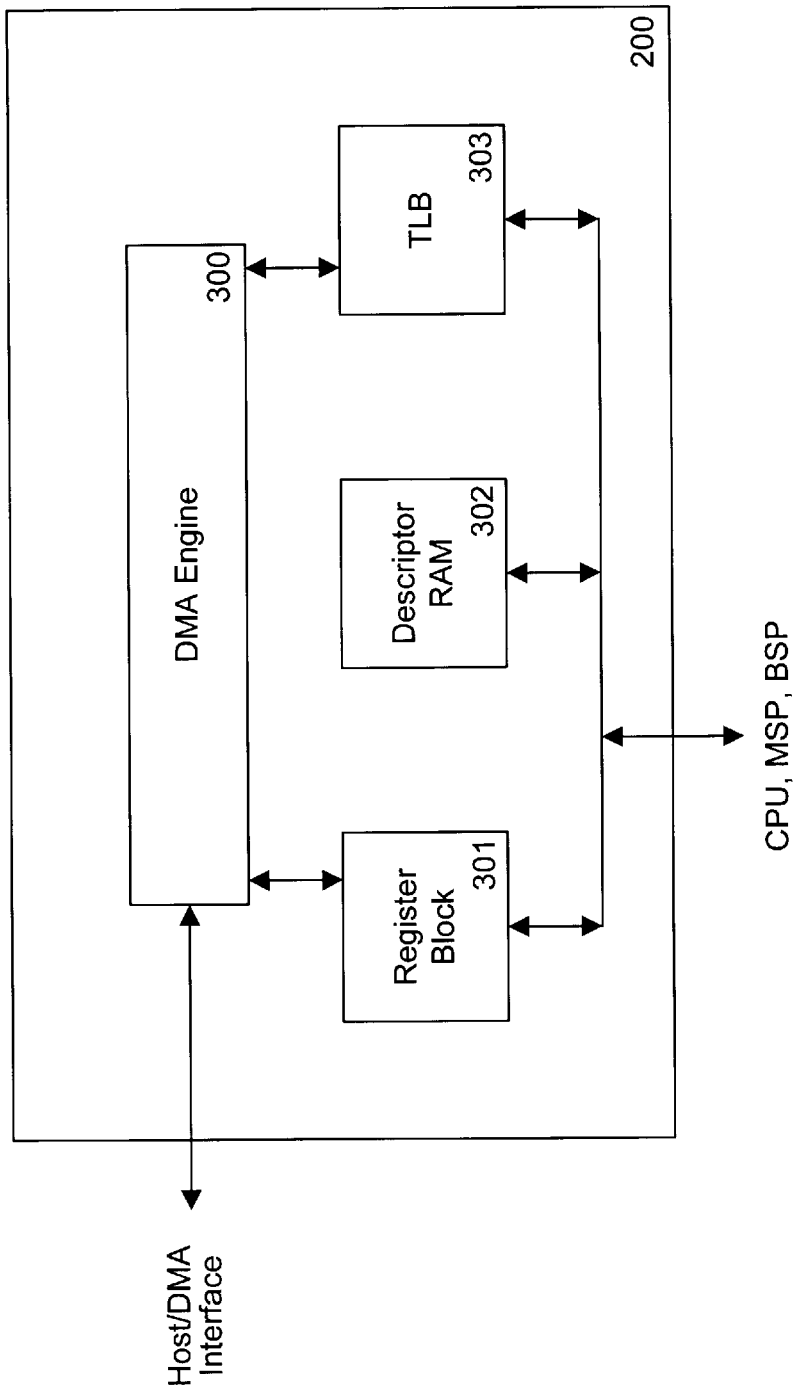
FIG. 3 is a block diagram illustrating the DMA unit which is a part of the video/graphics processor shown in FIG. 2.

Video/image processor 102 is illustrated in more details in FIG. 2. Briefly, video/image processor 102 comprises host/DMA interface 201, DMA unit 200, media signal processor (MSP) 202, and bit stream processor (BSP) 203. Host/DMA interface 201 provides the interface between video/image processor 102 and bus 100. Because video/image processor 102 shares bus 100 with central processor 101 and memory and graphics controller 103, host/DMA interface 201 also communicates with central processor 101 and memory and graphics controller 103 to arbitrate for the right to use bus 100 at any one time. Only upon gaining control of bus 100 can video/image processor 102 initiate transactions on bus 100.

There are two internal buses that connect DMA unit 200, BSP 203, and MSP 202 to each other to allow these units access to any memory resource residing in any of the units. DMA bus 205 also connects host/DMA interface 201, BSP 203, and DMA unit 200 to the data memory banks inside MSP 202. Common bus 206 connects host/DMA interface 201, BSP 203, DMA unit 200, and MSP 202 together to allow these units access to memory resources including registers inside video/image processor 102 other than the data memory banks and instruction memory banks inside MSP 202. In having these internal buses, two clients are allowed access to the data memory banks simultaneously provided that the requested banks are different. In addition, having these internal buses allows access by any client to common bus 206 while allowing transactions to occur on other buses.

MSP 202 is used to perform graphics/video image data processing. In addition to two digital signal processors, MSP 202 has data memory banks (a.k.a local memory) for the storing graphics/video image data received from main memory 104 and for storing the firmware program operands. MSP 202 also has program memory banks for storing the firmware programs to process the graphics/video image data stored in the data memory banks. By having the digital signal processors, the program memory banks, and the data memory banks on the same chip, the access time and consequently processing time required is minimized.

BSP 203 is used to perform data compression and decompression. BSP 203 has a local processor, an instruction memory, and a table memory. The instruction memory stores the instruction codes to perform arithmetic operations, jump and branches operations, data transfer between memory and register operations, and manipulation of bit stream data. The instruction memory also stores instruction codes to perform table look up operations to decode bit stream data. The table memory stores decompression and compression algorithms used in look up operations. The architecture of BSP 203 allows real-time compression and decompression of high bit rates in low-compression JPEG and MPEG-2 standards.

DMA unit 200 performs DMA transfers between main memory 104 (via memory and graphics controller 103) and memory resources (e.g., local memory) inside video/image processor 102. DMA unit 200 has two DMA channels. DMA unit 200 comprises DMA engine 300, register block 301, descriptor RAM 302, and translation buffer (TLB) 303. Descriptor RAM 302 stores descriptor requests programmed by either central processor 101, MSP 202, or BSP 203 to initiate a DMA transfer. Descriptor requests are used to define starting addresses, DMA modes (i.e., read, write, color space components splitting and interleaving, etc.), width setting (i.e., number of data words for transferring per line), and stride setting (i.e., number of words to skip per line). A descriptor can be used to halt the DMA engine. Register block 301 houses control registers which are programmed by central processor 101, MSP 202, or BSP 203 to initiate DMA transfer. The control registers inside register block 301 provide the information DMA engine 300 needed for controlling a DMA transaction (e.g., the current address, DMA ON/OFF switch, word count, etc) as well as status information for feedback purpose. In other words, the control registers further define the character of the DMA transfer. TLB 303 is a look-up table used to map an address space to main memory 104. The contents of the addresses of TLB 303 are used to form part of the complete main memory address space Descriptor request from descriptor RAM 302 along with the contents of the control registers in register block 301 are passed on to DMA engine 300 which performs the DMA transfer. DMA engine 300 also houses the arrangement to carry out aspects of the present invention as will be described below.

Figure 4:
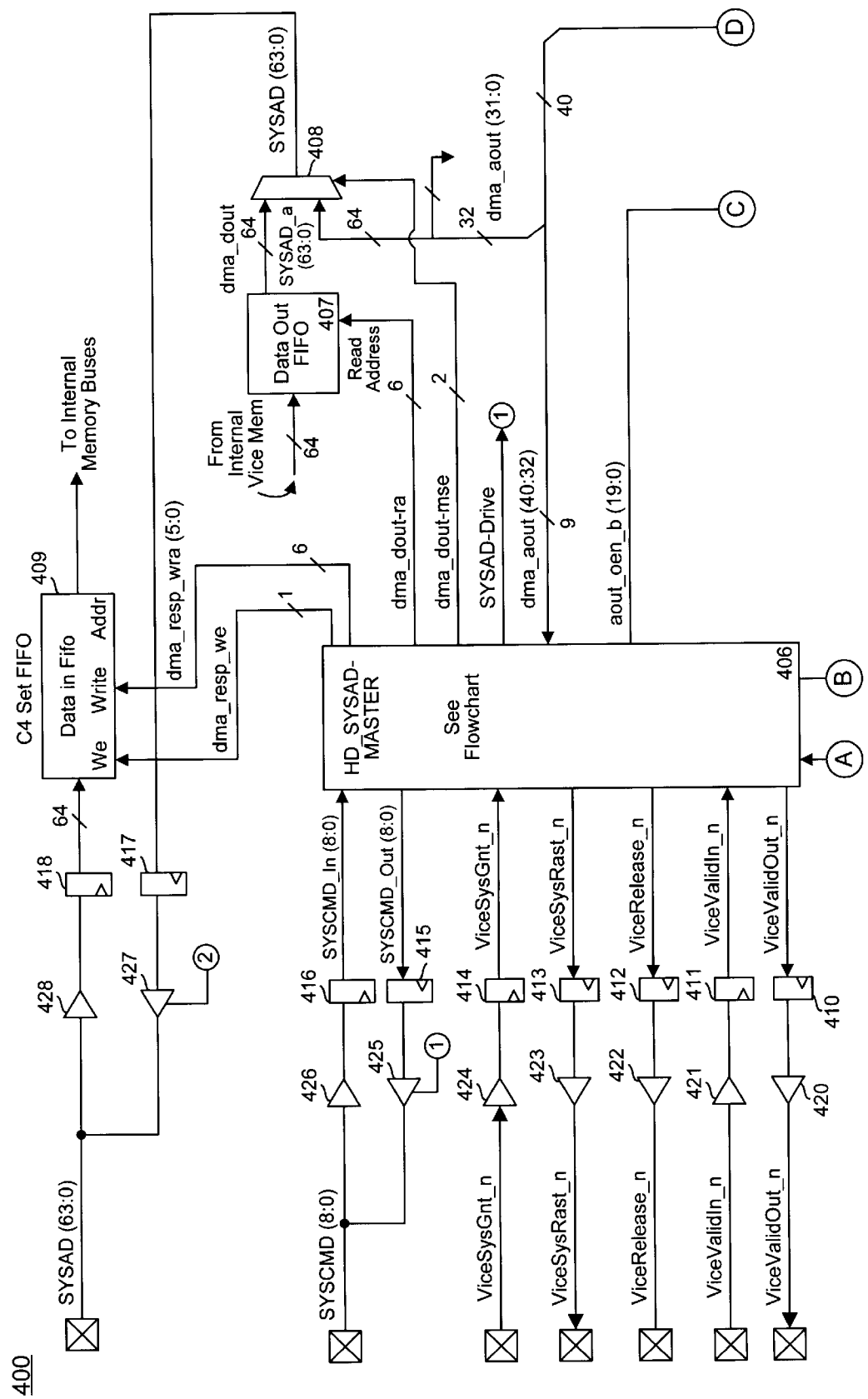
FIG. 4 is a block diagram illustrating the preferred embodiment of the arrangement for performing multiple transactions in a single DMA transfer.
Figure 4:
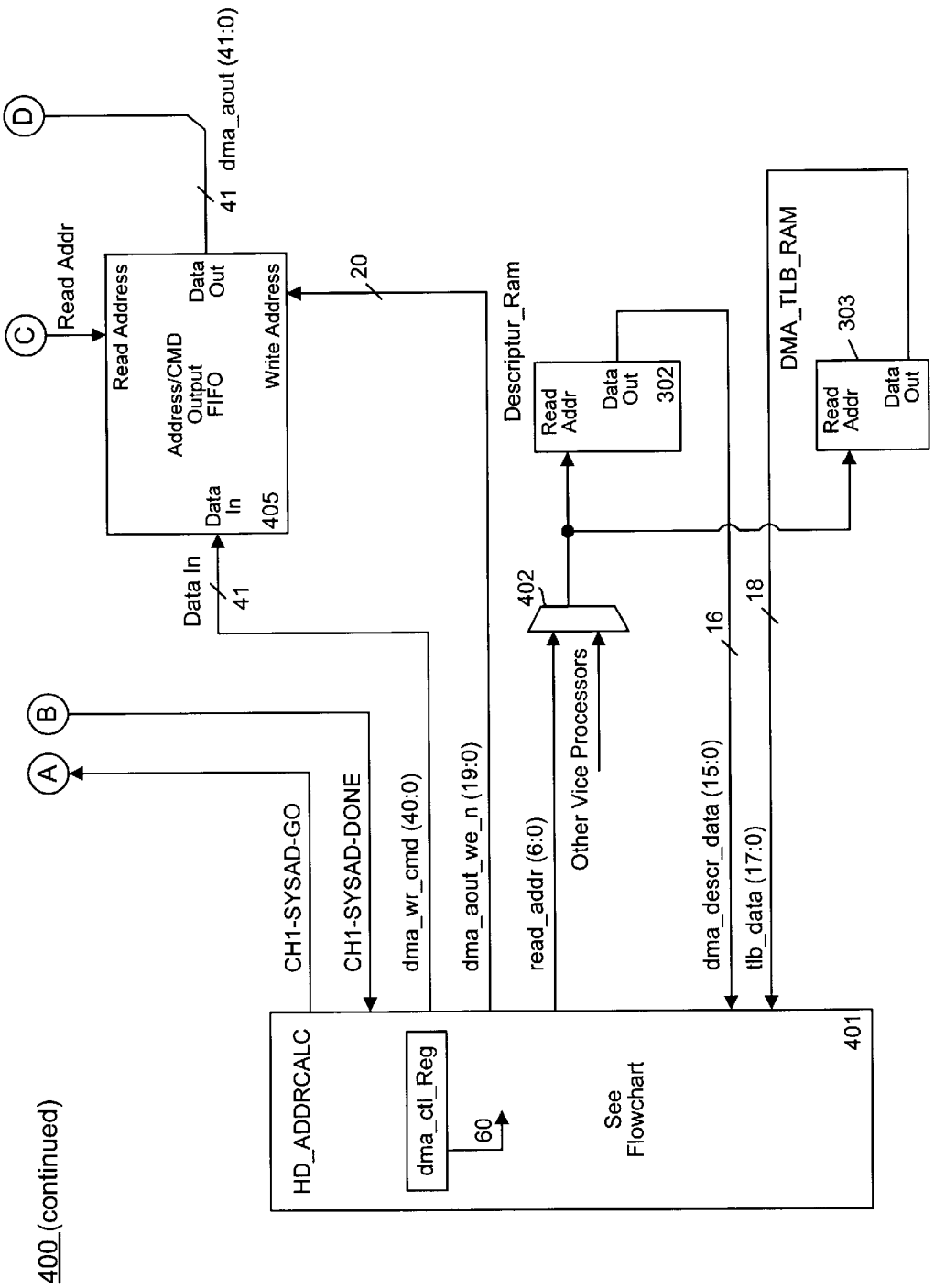

Referring now to FIG. 4 illustrating the preferred embodiment of the arrangement 400 to perform multiple transactions in a single DMA transfer. The preferred embodiment of the current invention allows a single DMA transfer to perform up to eight (8) read or write transactions of multiple (i.e., 2, 4, 6, or 8) words. It should be clear to a person of ordinary skill in the art that the current invention is applicable to any number of transactions of any number of words.

HD_ADDRCALC state machine 401 generates the addresses and commands for the multiple transactions per each DMA transfer. Upon receiving a go-ahead from the central processor 101 by the activation of signal DMA_CTL_REG, HD_ADDRCALC state machine 401 generates signal read_addr(6:0). Signal read_addr(6:0) is sent to the input of multiplexer 402 to contend for access to descriptor RAM 302 with bit stream processor 203 and media signal processor 202. In that case, multiplexer 402 also receives as input similar signals from other video/graphics processors and passes a selected input out as its output to descriptor RAM 302 and TLB 303. If computer system 112 involves only one video/graphics processors, then signal read_addr(6:0) is sent directly to descriptor RAM 302 and TLB 303.

Upon receiving this signal, descriptor RAM 302 retrieves descriptor request information that has been downloaded to descriptor RAM 302 by central processor 101 when it initiates a DMA transfer. Each descriptor request includes information on the number of transactions (i.e., rows of small data area), up to eight (8) system memory row starting addresses, the number of words per transaction, and the number of words to skip until the next row starting address. The descriptor requests are sent to HD_ADDRCALC state machine 401 via signal dma_descr_data(15:0). Likewise, upon receiving the output signal from multiplexer 402, TLB 303 retrieves the contents of its table addresses and provides them to HD_ADDRCALC state machine 401 to form the complete system/main memory addresses. TLB 303 provides this information to HD_ADDRCALC state machine 401 over signal tlb_data(17:0).

HD_ADDRCALC state machine 401 utilizes the information from signals dma_descr_data(15:0) and tlb_data (17:0) to generate the DMA commands and the associated system memory starting addresses as signal dma_wr_cmd (40:0). Additionally, HD_ADDRCALC state machine 401 monitors the address/cmd output FIFO 405 addresses where the information carried by signal dma_wr_cmd(40:0) are stored. HD_ADDRCALC state machine 401 communicates these addresses to address/cmd output FIFO 405 over signal dma_aout_we_n(19:0). Signals dma_wr_cmd(40:0) and dma_aout_we_n(19:0) are provided as inputs to address/cmd output FIFO 405. HD_ADDRCALC state machine 401 also exchanges handshake signals with HD_SYSAD_MASTER state machine 406 over handshake signals CH1_SYSAD_GO and CH1_SYSAD_DONE.

Figure 5:
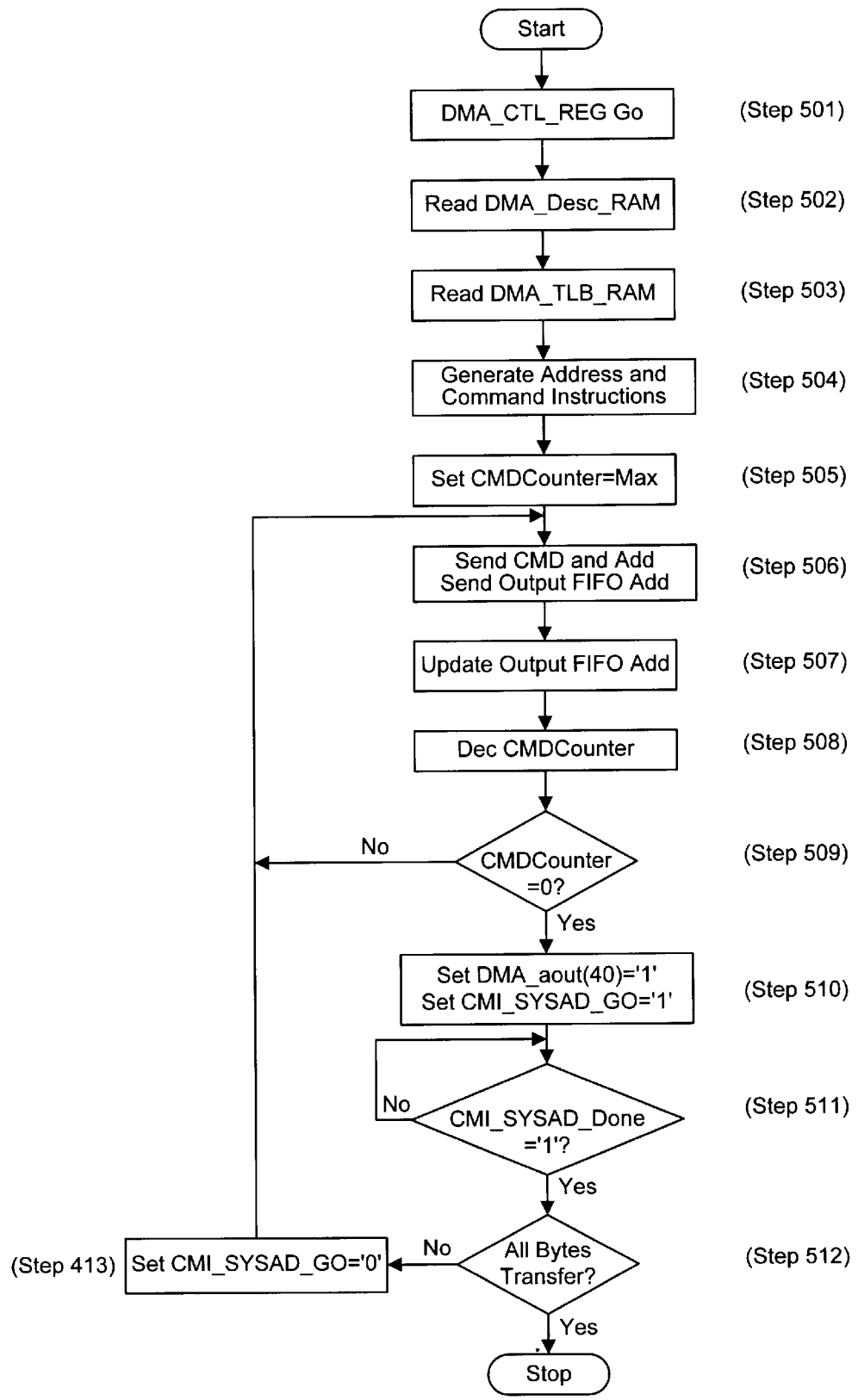
FIG. 5 is a flow chart illustrating the state operations of the HD_ADDRCALC state machine shown in FIG. 4.

Referring now to FIG. 5 illustrating the operation steps of HD_ADDRCALC state machine 401 to generate the DMA commands and the associated starting addresses over signals dma_wr_cmd(40:0) and dma_aout_we_n(19:0). HD_ADDRCALC state machine 401 monitors the content of register DMA_CTL_REG for a start signal (step 401). Upon receiving a start signal (e.g., a specific bit of register DMA_CTL_REG is set to one (1)), HD_ADDRCALC state machine 401 checks signal descr_read_sm_go to determine whether data provided by descriptor RAM 302 over signal dma_desc_data(15:0) is ready. When signal descr_read_sm_go is high indicating that the data is ready to be read, HD_ADDRCALC state machine 401 loads eight descriptor entries from signal dma_desc_data(15:0) into its designated internal registers (step 502). HD_ADDRCALC state machine 401 performs individual accesses of the content of TLB 303 to determine system addresses (step 503).

Based on the descriptor request information provided by descriptor RAM 302 and TLB 303, HD_ADDRCALC state machine 401 generates the necessary commands and the associated system memory addresses for up to eight transactions per each DMA transfer (step 405). More particularly, using address information from TLB 303 and descriptor RAM 302, HD_ADDRCALC state machine 401 can determine the starting memory address for the first row of the compressed data block (i.e., small rectangular data area). Next, knowing the size of the system memory (e.g., 32 bytes wide) and using information on the row width (i.e., number of words per transaction) and stride (i.e., number of words to skip from the end of the previous compressed block row to the beginning of the next row), the starting addresses of successive rows of the compressed data block can be calculated. HD_ADDRCALC state machine 401 also receives information on the type of transaction (i.e., read or write) from descriptor RAM 302. Coupled with information on the desired number of transactions per DMA transfer, HD_ADDRCALC state machine 401 compiles the above information into a desired number of commands each including information on the type of transaction involves, the number of words to be transferred per each transaction, and the starting system memory address for each transaction.

To monitor the number of transaction commands sent to ADDDRESS/CMD output FIFO 405, information on the number of transactions involved in the current DMA transfer is loaded into cmdcounter (step 505). When both HD_ADDRCALC state machine 401 and ADDDRESS/CMD output FIFO 405 are ready, HD_ADDRCALC state machine 401 sends a command and the associated system memory starting address over signal dma_wr_cmd(40:0) to ADDDRESS/CMD output FIFO 405. HD_ADDRCALC state machine 401 concurrently sends the ADDRESS/CMD output FIFO address where the information is going to be stored to ADDDRESS/CMD output FIFO 405 over signal dma_aout_we_n(19:0) (step 506). HD_ADDRCALC state machine 401 then updates the pointer to the next ADDRESS/CMD output FIFO address (step 507) and decrements cmdcounter by one (step 508) signifying that one transaction entry of the DMA transfer has been sent.

HD_ADDRCALC state machine 401 then monitors the value of cmdcounter to determine whether all transaction entries for the DMA transfer have been sent (step 509). If the cmdcounter is not equal to zero (0) indicating that there are more transaction entries to be sent to ADDRESS/CMD output FIFO 405, HD_ADDRCALC state machine 401 goes back to step 506.

If the value of cmdcounter is equal to zero (0) indicating that all the transaction entries have been sent, then signals dma_aout(40) (the alternative being signal SYSCMD(8)) and CH1_SYSAD_GO are set to high (1) indicating to central processor 101 and HD_SYSAD master state machine 406 that the last transaction entry has been sent to ADDRESS/CMD output FIFO 405 (step 510). When signal CH1_SYSAD_GO, which is sent to HD_SYSAD master state machine 406, is high, HD_SYSAD master state machine 406 takes over to generate its state operations. However, until signal CH1_SYSAD_DONE is activated high by HD_SYSAD master state machine 406 indicating that the DMA transfer is complete, HD_ADDRCALC state machine 401 stays in a loop because it assumes that its service is still needed for the current DMA transfer and does not start working on the next DMA transfer (step 511).

When signal CH_1_SYSAD_DONE is activated high, HD_ADDRCALC state machine 401 next checks to determine if all the data bytes to be DMA transferred have been sent (step 512). In the case of a large DMA transfer (e.g., greater than 256 bytes), the total number of bytes are not transferred, HD_ADDRCALC state machine 401 resets signal CH1_SYSAD_GO to low (0) to resend the transaction entries of the current DMA transfer (step 513). Control is then transferred back to step 506. Otherwise, the DMA transfer is complete.

HD_SYSAD master state machine 406 communicates and establishes control of bus 100 for DMA transfer. HD_SYSAD master state machine 406 communicates with bus 100 through handshake signals ViceValidOut_n, ViceValidIn_n, ViceRelease_n, ViceSysRqst_n, and ViceSysGnt_n. Furthermore, HD_SYSAD master state machine 406 sends and receives command instructions over signals Syscmd_out(8:0) and Syscmd_in(8:0), respectively. Moreover, HD_SYSAD master state machine 406 sends address and data information related to a DMA transfer over signal Sysad(63:0). Signal ViceSysRqst_n is used by HD_SYSAD master state machine 406 to gain control of bus 100 for DMA transfer. Signal ViceSysGnt_n indicates to HD_SYSAD master state machine 406 whether it has been given control of bus 100. Signal ViceRelease_n is used by HD_SYSAD master state machine 406 to indicate that it is through with bus 100. Signal ViceValidOut_n indicates whether address information and command instructions are being sent over bus 100 from HD_SYSAD master state machine 406. Signal ViceValidIn_n indicates whether data information and command instructions are being sent over bus 100 to HD_SYSAD master state machine 406.

To ensure that the intended designations of handshake signals ViceValidOut_n, ViceValidIn_n, ViceRelease_n, ViceSysRqst_n, ViceSysGnt_n, Syscmd_out(8:0), ViceSyscmd_in(8:0), and sysad(63:0) have sufficient time to receive these signals, these signals are provided as input to registers 410–418 respectively. Registers 410–418 function similarly to a D flip-flop in keeping the value latch for a clock cycle. The above signals are buffered from the high impedance of bus 100 by buffers 420–428.

In a read DMA transfer, HD_SYSAD master state machine 406 reads transaction entries in ADDRESS/CMD Output FIFO 405 by providing ADDRESS/CMD Output FIFO 405 with signal aout_oen_b(19:0). Signal aout_oen_b(19:0) contains the address of the transaction entry that HD_SYSAD master state machine 406 wants to retrieve. ADDRESS/CMD Output FIFO 405 retrieves the transaction entry stored at this address and provides it over signal dma_aout(40:0). Signal dma_aout(40:0) is split into two signals dma_aout(40:32) and dma_aout(31:0). Signal dma_aout(40:32) carries the command instruction and is provided as input to HD_SYSAD master state machine 406. Signal dma_aout(31:0) carries the address information and is provided as input to multiplexer 408. Prior to being input into multiplexer 408, binary bits having a low value are added to signal dma_aout(31:0).

To initiate a read DMA transfer, HD_SYSAD master state machine 406 activates signal ViceSysRqst_n to arbitrate for the control of bus 100. When signal ViceSysGnt_n is activated, HD_SYSAD master state machine 406 is granted control of bus 100. In the preferred embodiment, bus 100 is a mutliplexed address data bus which means that address and data information are sequentially sent over signals SYSAD(63:0) which is part of bus 100. Signals SYSCMD(8:0) over which command instructions are communicated are also a part of bus 100. HD_SYSAD master state machine 406 activates signal sysad_drive to enable driver 425 to put command instructions carried by signal syscmd_out(8:0) on SYSCMD(8:0). HD_SYSAD master state machine 406 also activates select signal dma_dout_msel which orders multiplexer 408 to provide input signal sysad_a(63:0) as its output signal Sysad(63:0). Signal sysad_drive also enables driver 427 to put address information carried by signal Sysad(63:0) on SYSAD(63:0). Signal sysad_drive allows a transaction command instruction and the corresponding starting address to be put on bus 100 on the same clock cycle.

Figure 6:
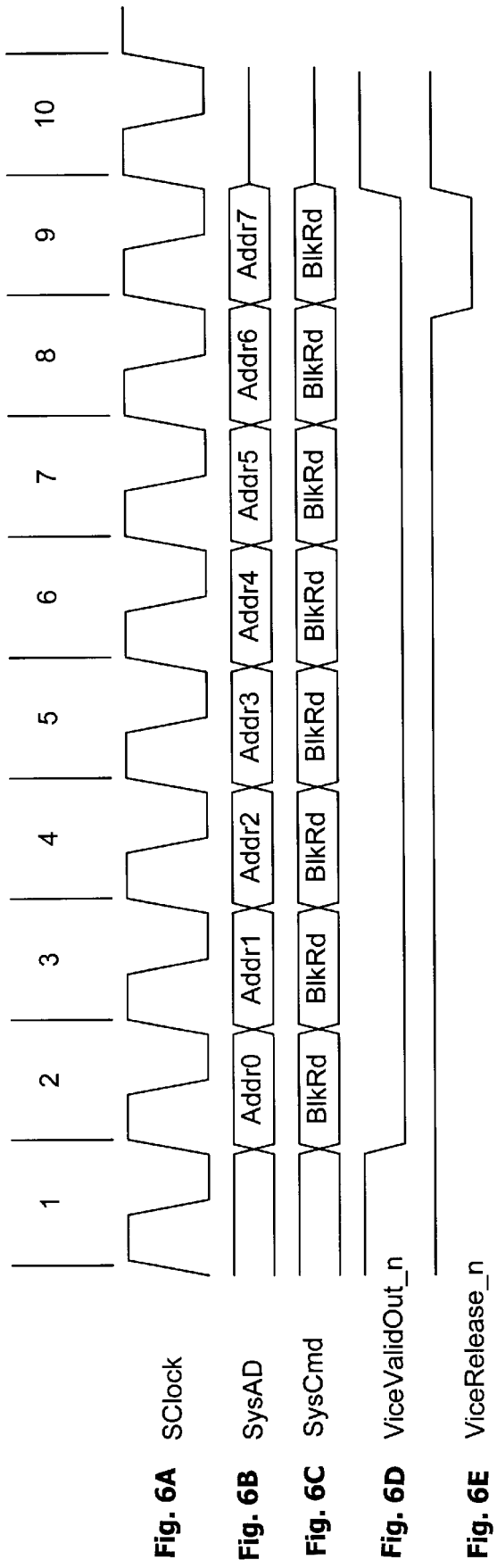
FIGS. 6A–6E are timing diagrams of a request for a DMA read transfer having multiple transactions.

At this time, HD_SYSAD master state machine 406 is ready to conduct a read operation over bus 100. FIGS. 6A–6E illustrate, as examples, the timing diagrams of HD_SYSAD master state machine 406 in conducting a DMA read transfer request on bus 100. In FIG. 6D, HD_SYSAD master state machine 406 activates signal ViceValidOut_n to indicate that address information and command instructions are being simultaneously sent over SYSAD(63:0) and SYSCMD(8:0), respectively. As shown in FIG. 6C, each BlkRd command represents a read transaction command with word count information. Upon the completion of the command instructions and address information transfer, HD_SYSAD master state machine 406 deactivates signal ViceValidOut_n and indicates its release of bus 100 by deactivating signal ViceRelease_n (FIG. 6E).

Figure 7:
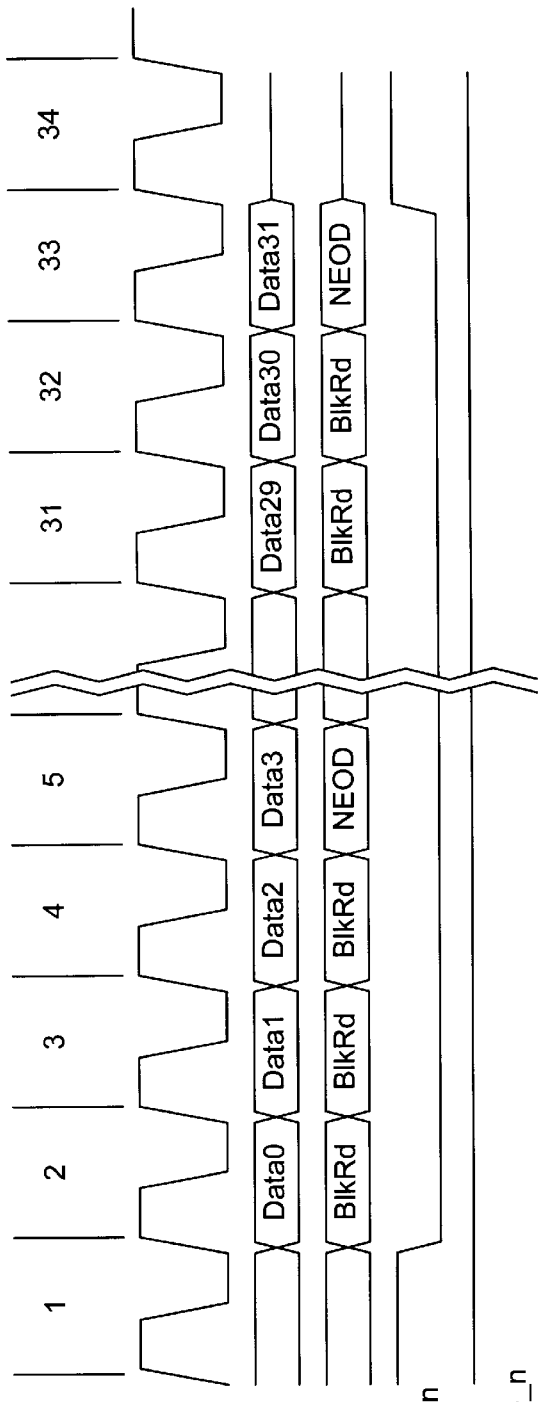
FIGS. 7A–7E are timing diagrams of a response for a DMA read transfer having multiple transactions.

Upon receiving the command instructions and address information from HD_SYSAD master state machine 406, memory and graphics controller 103 responds by first gaining control of bus 100. Memory and graphics controller 103 then retrieves data from memory locations specified by the address information received. Next, memory and graphics controller 103 activates signal ViceValidIn_n to indicate that data retrieved from designated memory locations and command instructions are being sent over SYSAD(63:0) and SYSCMD(8:0). FIGS. 7A–7E illustrates, as examples, the timing diagrams of a DMA read transfer response by memory and graphics controller 103 to a DMA read transfer request initiated by HD_SYSAD master state machine 406. In FIGS. 7B–7D, when signal ViceValidIn_n is deactivated, data along with associated data identifiers (i.e., BlkRd and NEOD) are simultaneously sent over SYSAD(63:0) and SYSCMD(8:0). A data identifier BlkRd, shown in FIG. 7C, indicates that the data received simultaneously on SYSAD (63:0) is a response read data and whether there is error in the data. A data identifier NEOD, shown in FIG. 7C, indicates that the data received simultaneously on SYSCMD (63:0) is the last response read data in a DMA transfer and whether there is error in the data.

HD_SYSAD master state machine 406 receives the command instructions from SYSCMD(8:0). Data information are received over SYSAD(63:0) and then sent to DATA IN FIFO 409 for storage. At this time, signal ViceValidIn_n is deactivated to indicate that the transfer is complete. HD_SYSAD master state machine 406 then generates and provides enable signal dma_resp_we and address signal dma_resp_wra(5:0) to DATA IN FIFO 409. While signal dma_resp_we enables DATA IN FIFO 409, signal dma_resp_wra(5:0) provides the addresses of DATA IN FIFO 409 locations where data is to be stored. DATA IN FIFO 409 outputs the retrieved data to internal memory location in video/image processor 102. This concludes the read DMA transfer.

In a write DMA transfer, address and data information are transferred from internal memory inside video/image processor 102 into DATA OUT FIFO 407. HD_SYSAD master state machine 406 generates signal dma_dout_ra which provides the addresses of the location inside DATA OUT FIFO 407 where information is being retrieved. DATA OUT FIFO 407 then provides the retrieved information over signal dma_dout(63:0) as input to multiplexer 408. This time, HD_SYSAD master state machine 406 generates select signal dma_dout_msel which orders multiplexer 408 to pass input signal dma_dout(63:0) through as output signal Sysad(63:0).

Meanwhile, HD_SYSAD master state machine 40 activates signal ViceSysRqst_n to arbitrate for the control of bus 100. When signal ViceSysGnt_n is activated, HD_SYSAD master state machine 406 is granted control of bus 100. In response, HD_SYSAD master state machine 406 activates signal sysad_drive to enable driver 427 to put signal Sysad(63:0) on SYSAD(63:0). At the same time, HD_SYSAD master state machine 406 outputs signals Syscmd_out(8:0) to driver 425 via register 415. Signal sysad_drive also enables driver 425 to put signal Syscmd_out(8:0) on SYSCMD(8:0).

Figure 8:
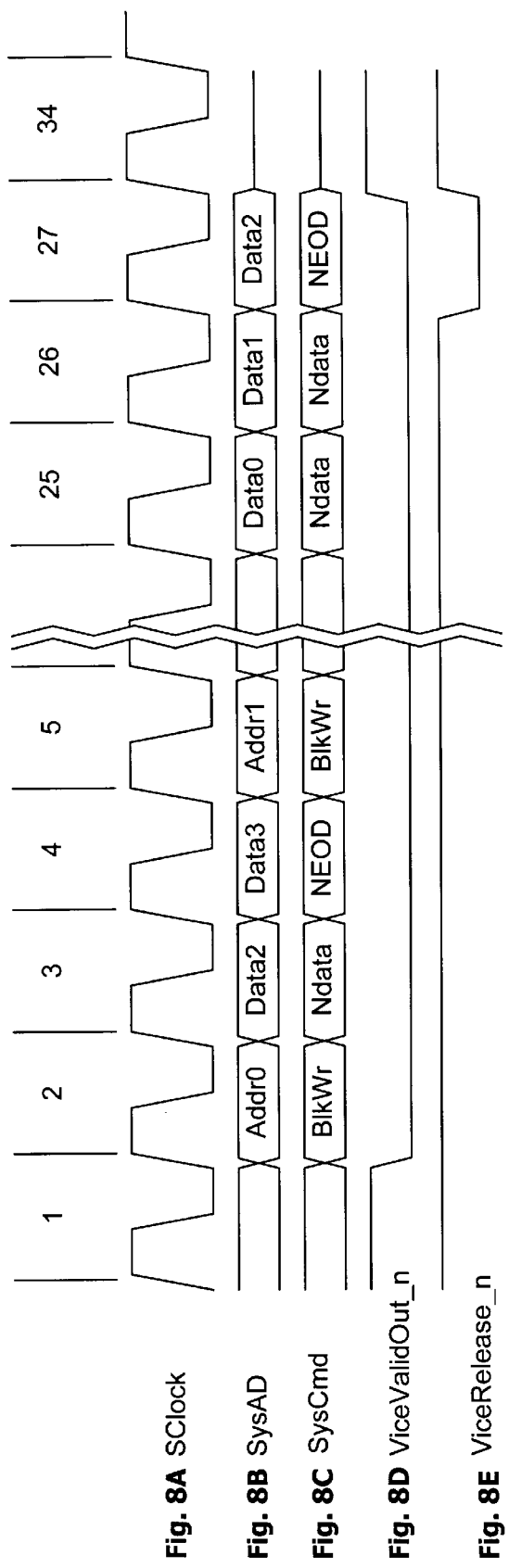
FIGS. 8A–8E are timing diagrams of a DMA write transfer having multiple transactions.

At this time, HD_SYSAD master state machine 406 is ready to conduct a write operation over bus 100. FIGS. 8A–8E illustrate, as examples, the timing diagrams of a DMA write transfer on bus 100. In FIG. 8D, HD_SYSAD master state machine 406 activates signal ViceValidOut_n to indicate that address information and command instructions are being simultaneously sent over SYSAD(63:0) and SYSCMD(8:0), respectively. As shown in FIG. 8B, the starting address for each write transaction followed by data to be written are sent over SYSAD(63:0). In FIG. 8C, each BlkWr command represents a write transaction command with word count information. Ndata is a data identifier indicating that the data being sent simultaneously on SYSAD(63:0) is not the last data of the write transaction as well as whether there is any error. NEOD is another data identifier indicating that the data being sent concurrently is the last data of the write transaction and whether there is any error. Upon the completion of the DMA write transfer, HD_SYSAD master state machine 406 deactivates signal ViceValidOut_n (FIG. 8D) and indicates its release of bus 100 by deactivating signal ViceRelease_n (FIG. 8E). This concludes the write operation.

Figure 9:
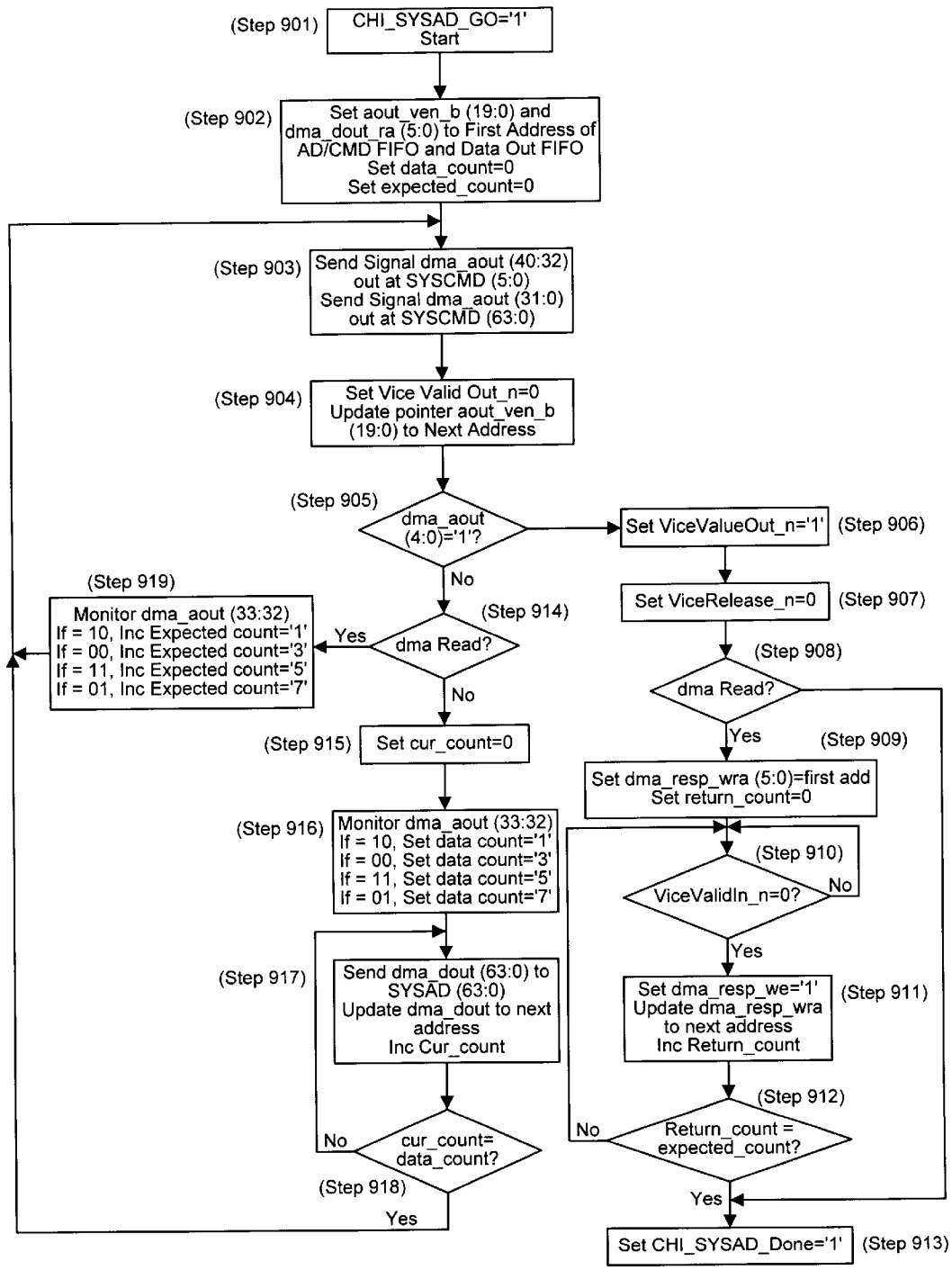
FIG. 9 is a flow chart illustrating the state operations of the HD_SYSADMASTER state machine shown in FIG. 4.

Referring now to FIG. 9 illustrating the operation steps of HD_SYSAD master state machine 406 to establish communications with and control of bus 100. Upon receiving a high CH1_SYSAD_GO signal (step 901), HD_SYSAD master state machine 406 is ready to start its operations by performing a few initializations (step 902). To access the first transaction entry, HD_SYSAD master state machine 406 sets signal aout_oen_b(19:0) to the first address location of ADDRESS/CMD Output FIFO 405. Similarly, HD-SYSAD master state machine 406 sets signal dma_dout_ra(5:0) to the first address of DATA OUT FIFO 407. HD_SYSAD master state machine 406 also sets the count values in data_counter and expected_counter to zero (0). Expected_counter and data_counter are used to monitor the number of data words involved in read and write transactions, respectively.

Next, HD_SYSAD master state machine 406 retrieves the command instructions and address information from ADDRESS/CMD Output FIFO 405 using the address provided on signal dma_aout_we_n(19:0) and places them on bus 100 (i.e., fetching a transaction entry) (step 603). As discussed above, to place command instructions on bus 100, more specifically SYSCMD(8:0), HD_SYSAD master state machine 406 passes the binary values received from signal dma_aout(40:32) through to output signal Syscmdout(8:0). To place address information on bus 100, more specifically SYSAD(63:0), HD_SYSAD master state machine 406 generates select signal dma_dout_msel to command multiplexer 408 to allow input signal sysad_a(63:0) (i.e., signal dma_aout(31:0) with stuffed bits) to pass through as output signal Sysad(63:0).

To gain control of bus 100, HD_SYSAD master state machine 406 activates signal ViceSysRqst_n to arbitrate for the control of bus 100. When an activated signal ViceSysGnt_n is received, HD_SYSAD master state machine 406 is granted control of bus 100. In response, HD_SYSAD master state machine 406 activates signal ViceValidOut_n which indicates that address information, data information, and command instructions are being sent over bus 100 (step 903). At this time, HD_SYSAD master state machine 406 activates signal sysad_drive to enable driver 427 to put signal Sysad(63:0) on bus 100. At this time, HD_SYSAD master state machine 406 generates and sends drive signal Sysad_drive to drivers 425 and 427 to put signals Sysad(63:0) and Syscmd_out(8:0) on SYSAD(63:0) and SYSCMD(8:0), respectively.

HD_SYSAD master state machine 406 updates signal aout_oen_b(19:0) to point to the next address in ADDRESS/CMD Output FIFO 405 (step 904). HD_SYSAD master state machine 406 monitors bit 40 of signal dma_aout(40:32) (i.e., dma_aout(40)) to determine whether the last transaction entry from ADDRESS/CMD Output FIFO 405 has been read (step 905). If dma_aout(40) has a value of zero (0) indicating that there are more transaction entries left in ADDRESS/CMD Output FIFO 405, HD_SYSAD master state machine 406 stays in the loop to retrieve more transaction entries by executing step 914 next. If dma_aout(40) has a value of one (1) indicating that the last transaction entry has been read, HD_SYSAD master state machine 406 monitors the number of words transfer to ensure that the DMA transfer is complete by executing step 906 next.

Assuming that step 914 is executed next, HD_SYSAD master state machine 406 monitors bit 38 of signal dma_aout(40:32) (i.e., dma_aout(38)) to determine if a read or write transaction is involved. If the value of signal dma_aout(40) is high (1), the transaction is a read transaction. Otherwise, the transaction is a write transaction.

If a read transaction is involved, HD_SYSAD master state machine 406 monitors bits 32 and 33 of signal dma_aout(40:32) (step 919) to determine how many words are involved in the current read transaction. If the binary value of signal dma_aout(33:32) is 10, there are two (2) words in the read transaction and the expected_counter is increment by one (1). If the binary value of signal dma_aout(33:32) is 00, there are four (4) words and the expected_counter is increment by three (3). If the binary value of signal dma_aout(33:32) is 11, there are six (6) words and the expected_counter is increment by five (5). If the binary value of signal dma_aout(33:32) is 01, there are eight (8) words and the expected_counter is increment by seven (7). In doing so, the number of words received for the last read transaction can be monitored to ensure that all the words for the last read transaction have been received before signaling that the DMA transfer is complete. HD_SYSAD master state machine 406 monitors the total number of words to be received for all read transactions. Upon setting the value of signal dma_aout(33:32), HD_SYSAD master state machine 406 goes back to step 903 to fetch the next transaction entry.

If a write transaction is involved, HD_SYSAD master state machine 406 sets the value of cur_counter to zero (0) (step 915). The cur_counter is used to monitor the number of transferred words in a write transaction. Next, HD_SYSAD master state machine 406 monitors bits 32 and 33 of signal dma_aout(40:32) (step 916) to determine how many words are involved in the current read transaction. If the binary value of signal dma_aout(33:32) is 10, there are two (2) words in the read transaction and the data_counter is set to one (1). If the binary value of signal dma_aout (33:32) is 00, there are four (4) words and the data_counter is set to three (3). If the binary value of signal dma_aout (33:32) is 11, there are six (6) words and the data_counter is set to five (5). If the binary value of signal dma_aout (33:32) is 01, there are eight (8) words and the data_counter is set to seven (7). In doing so, the number of words to be transferred by the current write transaction can be monitored to ensure that all the words have been sent. HD_SYSAD master state machine 406 then goes to step 917.

In step 917, HD_SYSAD master state machine 406 again sends signal dma_dout(63:0) to SYSAD(63:0). Since the transaction is a write operation, up to 8 words have been down loaded into DATA OUT FIFO 407 from internal memory of video/image processor 102. DATA OUT FIFO 407 sends the data over signal dma_dout(63:0) to multiplexer 408. HD_SYSAD master state machine 406 generates select signal dma_dout_msel to command multiplexer 408 to pass input signal dma_dout(63:0) through as output signal Sysad(63:0). Assuming that HD_SYSAD master state machine 406 has control of bus 100 following the same step sequence discussed earlier, when drive signal Sysad_drive is generated, data on signal Sysad(63:0) is put on bus 100. HD_SYSAD master state machine 406 also updates signal dma_dout_ra to point to the next address in DATA OUT FIFO 407. The value of the cur_count is increment by one (1).

HD_SYSAD master state machine 406 then monitors the value of the cur_counter to determine whether all the words in each write transaction have been transferred (step 918). If the value of the cur_counter is equal to the value of the data_counter, all the words in the write transaction have been transferred. In this case, HD_SYSAD master state machine 406 goes back to step 903 to fetch the next transaction entry. If the value of the cur_counter is not equal to the value of the data_counter, HD_SYSAD master state machine 406 stays in the loop to keep sending the rest of the data words from DATA FIFO OUT 407 to bus 100. In this case, HD_SYSAD master state machine 406 goes back to step 917.

Assuming that step 914 (i.e., the last transaction entry has been retrieved) is executed next, HD_SYSAD master state machine deactivates signal ViceValidOUt_n by setting it to one (1) (step 906). HD_SYSAD master state machine 406 also release its control of bus 100 by setting signal ViceRelease_n to zero (0) (step 907). HD_SYSAD master state machine 406 then monitors to make sure that all the data words in the last read transaction have been receive.

To do so, HD_SYSAD master state machine 406 first monitors bit 38 of signal dma_aout(40:32) (i.e., dma_aout (38)) to determine if a read or write transaction is involved. If the value of signal dma_aout(40) is low (0), the transaction is a write transaction. In this case, HD_SYSAD master state machine 406 jumps to step 913 to set signal CH1_SYSAD_DONE to one (1) to indicate that the DMA transfer is complete.

If the value of signal dma_aout(40) is high (1), the transaction is a read transaction. HD_SYSAD master state machine 406 sets signal dma_resp_wra(5:0) to point to the first address of DATA IN FIFO 409 where data has been downloaded from bus 100. HD_SYSAD master state machine 406 also sets the value of the return_counter to zero (0) (step 909).

HD_SYSAD master state machine 406 monitors signal ViceValidIn_n to make sure that data being sent on bus 100 is actually for the read transaction (step 910). If signal ViceValidIn_n is high (1), the data being sent on bus 100 is not valid and should be ignored. In this case, HD_SYSAD master state machine 406 waits and continues monitoring signal ViceValidIn_n. If signal ViceValidIn_n is low (0), data on bus 100 is valid and must be retrieved. In this case, HD_SYSAD master state machine 406 goes on to step 911.

In step 911, HD_SYSAD master state machine 406 activates signal dma_resp_we high (1) and sends it to DATA IN FIFO 409. Signal dma_resp_we triggers DATA IN FIFO 409 to output the content of address sent by signal dma_resp_wra(5:0). HD_SYSAD master state machine 406 also sends the next address of DATA IN FIFO 409 over signal dma_resp_wra(5:0) to DATA IN FIFO 409. HD_SYSAD master state machine 406 also updates the number of data words received by incrementing the value of the return_counter.

The value of the return_counter is compared against the value of the exptected_counter in step 912 to make sure that all the data words for all read transactions of the DMA transfer has been received. If all the data words in the read transaction has not been received, control is transferred back to step 910 to continue. Otherwise, HD_SYSAD master state machine 406 sets signal CHL_SYSAD_DONE to high (1) to indicate that the DMA transfer is now complete (step 913).

The preferred embodiment of the present invention, an arrangement for a DMA transfer mode having multiple transactions, is thus described. While the present invention has been described in particular embodiments, the present invention should not be construed as limited by such embodiments, but rather construed according to the below claims.

What is claimed is:

1. An apparatus coupled to a central processor, a system memory, a system bus, and a local memory to perform a DMA transfer of a block of data having discontinuous memory addresses, the apparatus comprising:

an address calculating circuit coupled to the system bus which receives information regarding a block of memory locations inside the system memory, wherein the block of memory locations includes a plurality of memory location rows having discontinuous memory addresses, a memory location row having a plurality of memory locations for storing data words;

wherein the information regarding the block of memory locations comprises an address of a first memory location in a first row, a number of memory location rows, a number of data words per memory location row, and a number of memory locations to be skipped between rows; and wherein the address calculating circuit generates a plurality of transaction entries corresponding to the number of memory location rows each having a transaction type to be carried out, a starting memory address, and data word count of each transaction.

2. The apparatus of claim 1 further comprising:

a control circuit coupled to the system bus, the control circuit determining from information provided by the transaction entries a transaction count, transaction type, starting address of a transaction, and data word count of the transaction, the control circuit carrying out the transaction by communicating with the system bus, monitoring number of data words transferred in the transaction, and monitoring number of transactions performed;

wherein the address calculating circuit communicates to the control circuit when all the transaction entries have been generated.

3. The apparatus of claim 2 further comprising:

a second FIFO buffer coupled to the system bus and the local memory, the second FIFO buffer receiving as input data from the system memory via the system bus and transferring the input data to the local memory;

wherein the control circuit compares the data transferred from the second data FIFO buffer relative to the data word count to determine the completion of a write transaction.

4. The apparatus of claim 3 further comprising:

a third FIFO buffer coupled to the local memory and the system bus, the third FIFO buffer receiving as input data from the local memory and transferring the input data to the system memory via the system bus;

wherein the control circuit compares the data transferred from the third data FIFO buffer relative to the data word count to determine the completion of a read transaction.

5. The apparatus of claim 4 further comprising:

a first FIFO buffer coupled to the system bus receiving as input the transaction entries;

wherein the address calculating circuit places a marking indicating the end of the transaction entries when providing the transaction entries to the first FIFO buffer.

6. The apparatus of claim 5, wherein the control circuit monitors the marking indicating the end of the transaction entries to determine when the DMA transfer is complete.

7. The apparatus of claim 6, wherein the control circuit communicates to the address generating circuit when the DMA transfer is complete.

8. The apparatus of claim 2, wherein the control circuit communicates with the system bus to gain control of the system bus.

9. The apparatus of claim 6 further comprising a multiplexer receiving the data transferred from the third FIFO buffer at a first input and the starting addresses from the first FIFO buffer at a second input, the multiplexer providing as an output either the data transferred from the third FIFO buffer or the starting addresses from the first FIFO buffer in response to a control signal from the control circuit.

10. The apparatus of claim 9, wherein the control circuit provides the transaction types to be carried out as command instructions and the starting addresses on the system bus such that each command instruction and a corresponding starting address are provided in a same clock cycle.

11. The apparatus of claim 10, wherein the control circuit further provides data identifiers corresponding to data on the system bus.

12. The apparatus of claim 11, wherein the control circuit provides data and the corresponding data identifiers on the system bus in a same clock cycle.

13. The apparatus of claim 12, wherein the control circuit activates a valid data signal when command instructions, starting addresses, data identifiers, and data are placed on the system bus.

14. A computer system comprising:

a system bus;

a CPU coupled to the bus;

a memory controller coupled to the bus;

a main memory coupled to the memory controller; and a video/image processor coupled to the system bus, the video/image processor comprising:

an internal bus;

a local memory coupled to the internal bus; and an apparatus coupled to the internal bus to perform a DMA transfer of a block of data having discontinuous memory addresses, the apparatus comprising:

a first FIFO buffer coupled to the system bus receiving as input a plurality of transaction entries, the transaction entries providing information and instructions relating to transactions to be carried out by the apparatus;

a second FIFO buffer coupled to the system bus and the local memory, the second FIFO buffer receiving as input data from the system memory via the system bus and transferring the input data to the local memory;

a third FIFO buffer coupled to the local memory and the system bus, the third FIFO buffer receiving as input data from the local memory and transferring the input data to the system memory via the system bus;

a control circuit coupled to the first FIFO buffer, the second FIFO buffer, the third FIFO buffer, and the system bus, the control circuit determining from information provided by the transaction entries transaction count, transaction type, starting address of each transaction, and data word count of each transaction, the control circuit carrying out the transactions by communicating with the system bus, monitoring number of data words transferred in a transaction, and monitoring number of transactions performed; and an address calculating circuit coupled to the system bus which receives information regarding a block of memory locations inside the system memory, wherein the block of memory locations includes a plurality of memory location rows having discontinuous memory addresses, a memory location row having a plurality of memory locations for storing data words;

wherein the information regarding the block of memory locations comprises an address of a first memory location in a first row, a number of memory location rows, a number of data words per memory location row, and a number of memory locations to be skipped between rows; and wherein the address calculating circuit generates a plurality of transaction entries corresponding to the number of memory location rows each having a transaction type to be carried out, a starting memory address and the data word count of each transaction.

15. The computer system of claim 14, wherein the control circuit compares the data transferred from the second data FIFO buffer relative to the data word count to determine the completion of a write transaction.

16. The computer system of claim 14, wherein the control circuit compares the data transferred from the third data FIFO buffer relative to the data word count to determine the completion of a read transaction.

17. The computer system of claim 14, wherein the address calculating circuit places a marking indicating the end of the transaction entries when providing the transaction entries to the first FIFO buffer.

18. The computer system of claim 17, wherein the control circuit monitors the marking indicating the end of the transaction entries to determine when the DMA transfer is complete.

* * * * *